Sept. 28, 1965       C. ZELLWEGER ETAL       3,208,243
FINGERPIECE CONTROLLED GAS LIGHTERS
Filed July 23, 1963                        5 Sheets-Sheet 1

INVENTORS
CONRAD ZELLWEGER
WILLIAM RETZLER
BY
Ward, Neal, Haselton, Ormex McElhannon
ATTORNEYS

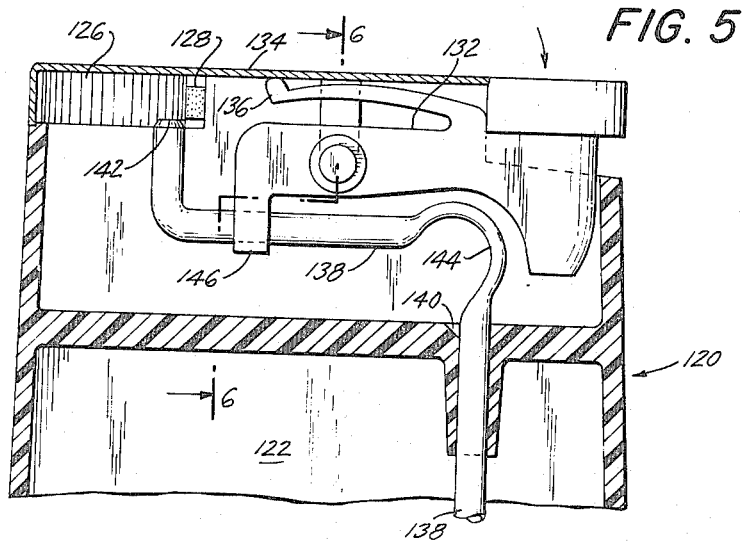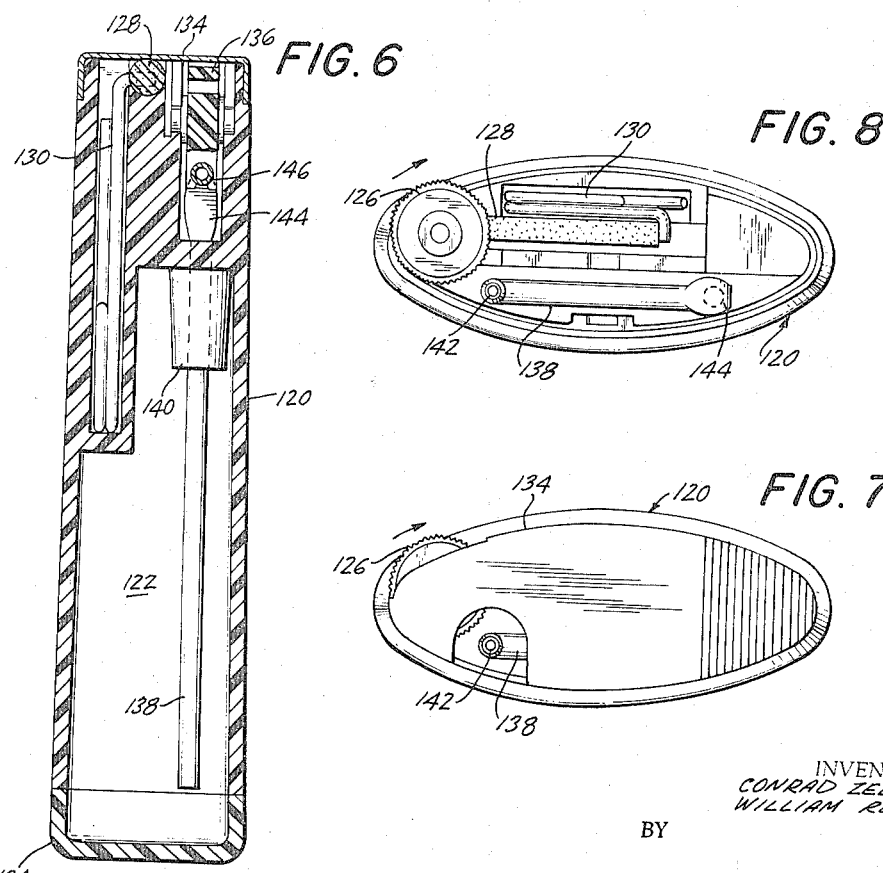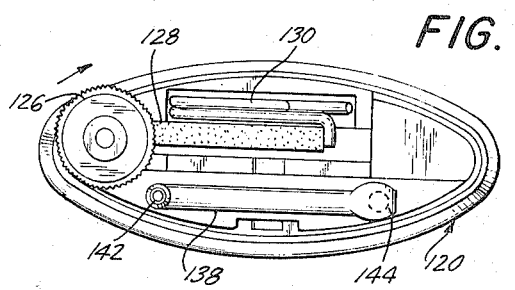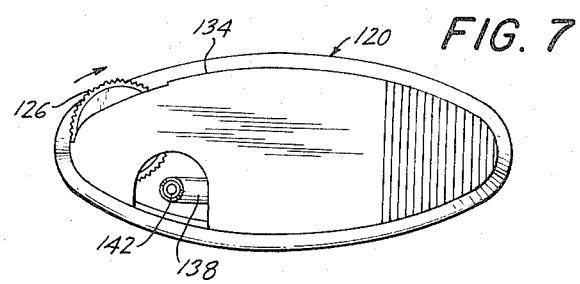

Sept. 28, 1965 C. ZELLWEGER ETAL 3,208,243
FINGERPIECE CONTROLLED GAS LIGHTERS
Filed July 23, 1963 5 Sheets-Sheet 5

INVENTORS
CONRAD ZELLWEGER
WILLIAM RETZLER
BY

Ward, Neal, Haselton, Orme & McElhannon
ATTORNEYS

United States Patent Office

3,208,243
Patented Sept. 28, 1965

3,208,243
FINGERPIECE CONTROLLED GAS LIGHTERS
Conrad Zellweger, Geneva, Switzerland, and William Retzler, Great Bookham, England, assignors of one-half to La Nationale S.A., Geneva, Switzerland, a corporation of Switzerland, and one-half to Ronson Corporation, Woodbridge, N.J., a corporation of New Jersey
Filed July 23, 1963, Ser. No. 297,128
Claims priority, application Switzerland, July 27, 1962, 9,013/62, 9,014/62; Great Britain, July 27, 1962, 28,919/62
10 Claims. (Cl. 67—7.1)

This invention relates to gas fueled cigar lighters and more particularly it concerns a fingerpiece operated gas lighter wherein the flow of fuel through a burner nozzle on the lighter is regulated by means of a movable fingerpiece.

In gas type lighters a highly volatile fuel is maintained within a reservoir in its liquid form under pressures substantially in excess of atmospheric pressure. During operation of the lighter, this fuel, in passing from the reservoir through a gas passage, is throttled down to atmospheric pressure thus converting it to gaseous form; and it is then expelled out through a burner nozzle and ignited. The size of the orifice through which the throttling process takes place determines the rate of fuel flow and consequently the height of flame maintained above the lighter.

Fine or gradual flow adjustment means are often provided to vary the size of the throttling orifice within given limits so as to obtain close control of the height of the flame above the lighter. Because of the nature of the fuels involved and because of the influence of these fuels upon flame height, the region over which the orifice is adjusted is small relative to its overall size.

For completely shutting off fuel flow so as to extinguish the flame and prevent fuel loss when the lighter is not in use, there are also provided positive flow control means which act to check and uncheck fuel flow either to or from the variable orifice.

The presence of gradual adjustment means and positive flow control means has accounted for a considerable portion of the complexity and cost of gas lighters. Very often the controls for these means are such as to require two handed operation of the lighter thus rendering the lighter generally inconvenient to handle and operate.

According to the present invention there is provided a lighter in which both positive flow control and gradual flow adjustment are effectuated by means of a single depressible fingerpiece element. The control system of the present invention provides simplification of both the construction and the operation of a gas lighter while maintaining complete and full control of fuel flow therein.

In one form of the invention the two functions of positive flow control and gradual flow adjustment are obtained through a compound valve arrangement wherein the gas passageway is provided at a first point with a partial, gradually adjustable constriction and at a second point is provided with a positive shut-off or check means. Both these items may be portions of a single movable valve element having surfaces inclined relative to its direction of movement by different amounts so as to obtain the gradual fine and positive course adjustment characteristics required. Also, the valve may be provided with two independently movable elements controlled through cam means from a single depressible fingerpiece.

In a second form the present invention provides positive flow control and gradual flow adjustment at a single point within a gas passage leading from the lighter fuel reservoir to its burner nozzle. This is achieved by providing at such point a variable construction which is adjustable from a complete closure to a gas passage opening commensurate with maximum flow. A depressible fingerpiece is provided with this arrangement and is connected to vary this orifice opening over this complete range. Complete and rapid depression of the fingerpiece upon ignition of the lighter ensures immediate and full opening of the fuel passageway; and subsequent partial release of the fingerpiece effects gradual flow adjustment for the control of flame height.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 5 is a section view of an upper portion of a lighter constituting a third embodiment of the present invention;

FIG. 6 is a section view of the lighter of FIG. 5 taken along line 6—6;

FIG. 7 is a top view of the lighter of FIGS. 5 and 6 with its cover attached;

FIG. 8 is a top view of the lighter of FIG. 5 and 6 with its cover removed;

Figure 1:
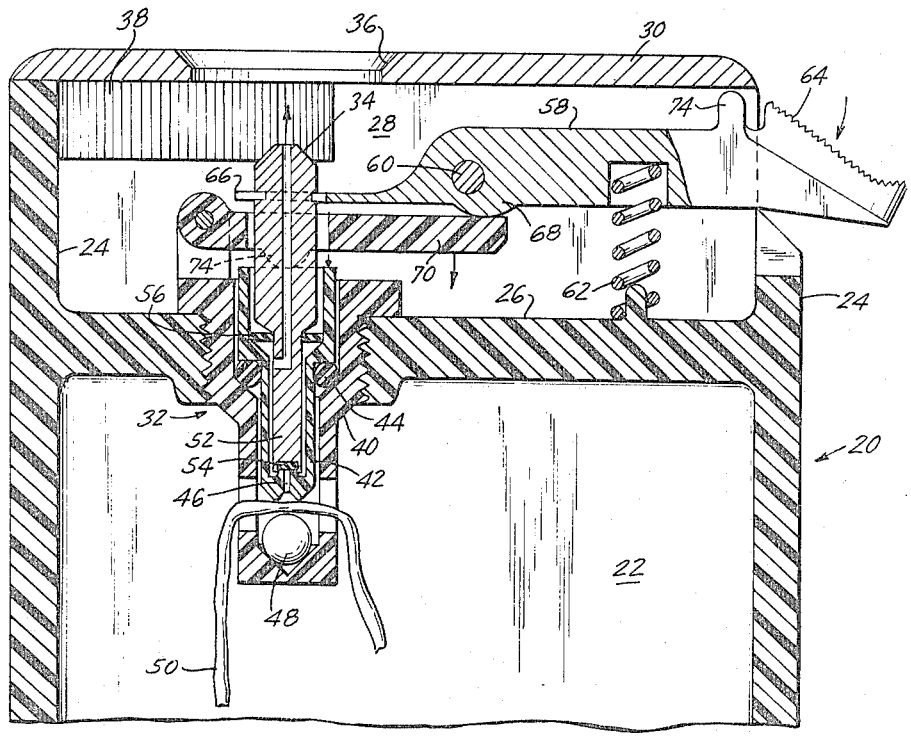
FIG. 1 is a section view of an upper portion of a lighter embodying the prevent invention.
Figure 2:
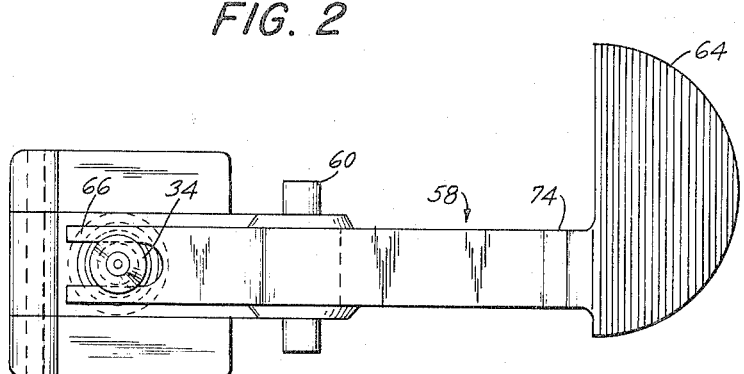
FIG. 2 is a top view of the fingerpiece and burner assembly of FIG. 1.

The lighter illustrated in FIGS. 1 and 2 includes a body means 20, having a pressurized fuel container 22 formed in its lower portion and provided with vertical walls 24 which rise above a top wall 26 of the fuel container to define an operating assembly housing 28. A cover piece 30 extends horizontally over the top of the lighter to enclose the operating assembly housing. A burner assembly 32 extends through and is sealably attached to the top wall 26 of the fuel container and contains a fuel passageway which extends from a point within the fuel container to a nozzle 34 at the top of the burner assembly. Fuel from the reservoir passes through the burner assembly and is ignited above the nozzle. A circular opening 36 is provided in the cover piece at a point directly above the nozzle 34 to permit the flame to rise above the lighter. A sparkling wheel 38 and a flint element (not shown) are arranged in the usual manner in the vicinity of the nozzle for ignition of the gases emitted therefrom.

The burner assembly 32 includes an outer housing 40 threadedly engaged in the top wall 26 of the fuel container and having a longitudinal opening within which extends a generally tubular gradual flow adjustment element 42.

The flow adjustment element is movable longitudinally relative to the burner housing but is sealable therewith by means of an O-ring 44. The lowermost portion of the gradual flow adjustment element contains a central gas passage 46, the end of which presses down against a spherical member 48 held in the burner housing. A wick 50 extends between the bottom end of the flow adjustment element and the spherical member; and the amount of pressure exerted between these two items controls the amount of fuel which the wick permits to flow up through the gas passage 46.

There is also provided within the gradual flow adjustment element 42 a longitudinally movable positive flow control element 52 which extends between the top of the gas passage 46 and the nozzle 34. The positive flow control element is provided with a sealing gasket 54 which presses down over the top of the gas passage 46 in the lower portion of the gradual flow adjustment element so as to obtain positive checking and unchecking of the flow of fuel therethrough. An annular seal 56 similar to the aforedescribed O-ring is provided between the positive flow control element 52 and the gradual flow adjustment element 42 to permit relative longitudinal movement between these items without leakage of high pressure gas to the atmosphere.

It will be appreciated that up and down movement of the positive flow control element 52 provides positive opening and closing of the top of the gas passage 46 whereas up and down movement of the gradual flow adjustment element 42 causes a variation of the effective opening at the bottom of the gas passage so that adjustment of flame height is thereby achieved.

Both the gradual flow adjustment element 42 and the positive flow control element 52 are controlled in their up and down movements by means of a single fingerpiece 58 which is pivotally mounted by means of an axle 60 extending from two side walls of the operating assembly housing 28. The single fingerpiece 58 is biased by means of a spring 62 to pivot in a generally counterclockwise direction (as viewed in FIG. 1), so that its outwardly projecting finger engageable portion, designated as 64 is in an upward or undepressed position. The opposite end of the fingerpiece is provided with a forked arrangement 66 which engages with corresponding slots in the nozzle 34. It will be seen that depression of the finger engaging portion of the fingerpiece causes the fingerpiece to rotate in a clockwise direction so as to raise the nozzle and positive flow control element 52 so as to permit fuel to pass out from the fuel passage 46 to the nozzle.

The fingerpiece 58 is also provided with a cam portion 68 in the vicinity of its axle 60. This cam portion presses downwardly upon a lever 70 which in turn is pivotally mounted on the operating assembly housing walls on opposite sides of the burner assembly. This lever also contains a pressing portion 74 which abuts against the top of the gradual flow adjustment element 42. Rotation of the depressible fingerpiece about the axle 60 causes the lever to press down against the gradual flow adjustment element to control the amount of fuel which enters into the passage 46. Thus, the two operations of unchecking and gradual flame adjustment are achieved in convenient manner from a single depressible fingerpiece.

Figure 3:
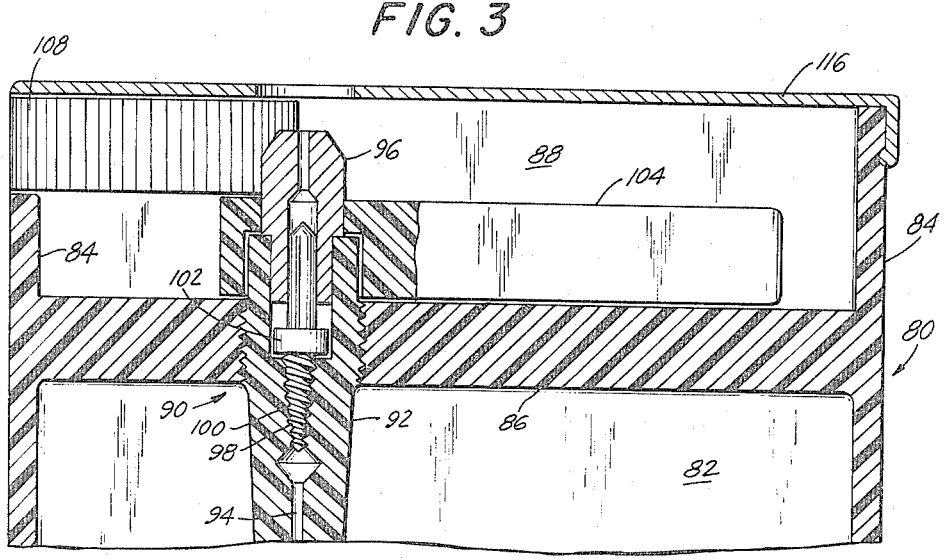
FIG. 3 is a section view of an upper portion of a lighter constituting a second embodiment of the present invention.
Figure 4:
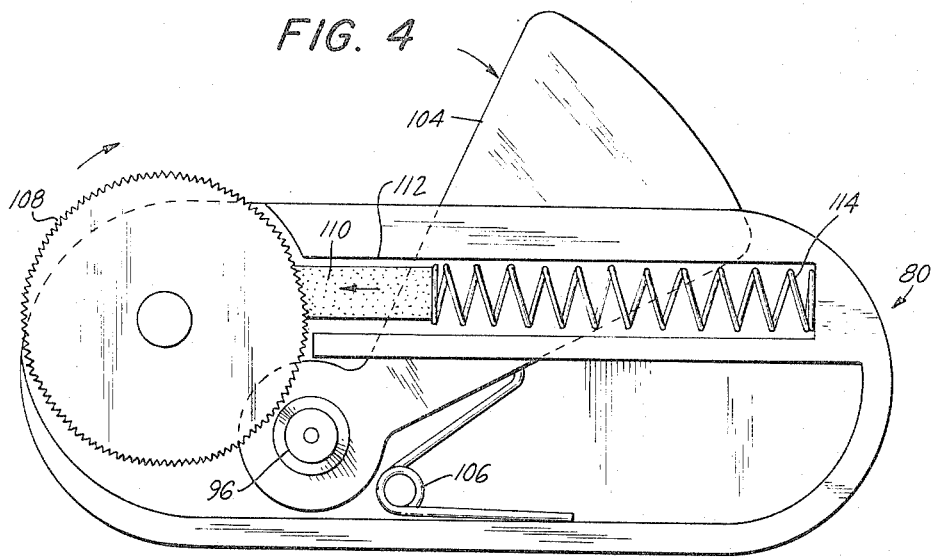
FIG. 4 is a top view of the lighter of FIG. 3 with its cover removed.

The embodiment shown in FIGS. 3 and 4 also includes a body 80 having a pulverized fuel container 82 formed in its lower portion and provided with vertical walls 84 which rise above a top wall 86 of the fuel container to define an operating assembly housing 88. As in the preceding embodiment the present lighter is provided with a burner valve assembly 90 having a housing 92 which is threadedly engaged in and extends through the top wall 86 of the ligher fuel container. This burner housing contains a longitudinal internal gas passageway 94 which extends between a point within the fuel container 82 and a nozzle element 96 mounted thereabove. The upper portion of the gas passageway is formed with a tapered thread 98 and accommodates a similarly tapered threaded portion 100 of a movable valve element 102. The upper portion of the movable valve element is fluted and extends into the nozzle element 96 to rotate therewith and yet to move longitudinally relative thereto, while at the same time permitting gaseous fuel to flow up between the flutes and out through the nozzle opening. The tapered screwthread configuration forms a helically shaped region in the fluid passageway connecting the interior of the fuel container and the nozzle element 96. The cross sectional area of this helically shaped portion may be adjusted simply by turning down the movable valve element 102 into the housing 92. This effectively varies the amount of fuel which flows out through the nozzle element and thus governs flame height. By turning the movable valve element down completely so that the threads interfere with the threads of the valve housing, the flow of fuel can be completely stopped.

A horizontally depressible fingerpiece 104 is mounted for rotation about the axis of the valve assembly 90 and is connected to the nozzle element 96 to cause rotation of the movable valve element 102. A coil spring 106 is provided to bias the fingerpiece outwardly from the side of the lighter in a direction such that the movable valve element is turned down fully to prevent fuel flow from the nozzle element.

A manually rotatable sparking wheel 108 is provided on the top of the lighter and a flint element 110 is guided in a longitudinal groove 112 cut in the lighter toward the peripherally abraded surface of the sparking wheel 108. A coil compression spring 114 is fitted in the groove 112 and urges the flint against the sparking wheel. A cover element 116 is affixed to the top of the lighter immediately above the sparking wheel and flint element to hold these items in proper spacial relationship.

In operation of the lighter the sparking wheel 108 is rotated manually in a clockwise direction as viewed in FIG. 4; and the user's thumb coming off the sparking wheel naturally falls against the fingerpiece 104, causing it to depress. This rotates and retracts the movable valve element 102 thus opening the helical portion of the gas passageway 94 to its fullest extent, permitting maximum fuel flow out through the nozzle element 96. The shower of sparks created by the rotation of the sparking wheel against the flint element causes the gases emanating from the burner nozzle to ignite. Adjustment of the flame height is achieved through partial release of the fingerpiece causing the helical passageway to constrict according to a desired fuel flow.

FIGS. 5 to 8 illustrate a third embodiment of the present invention. Here a lighter is shown to include a body member 120 formed with a fuel containing recess 122 in its lower portion. A lower cover 124 sealably attached to the bottom of the lighter closes the fuel containing recess. The upper portion of the body is recessed in a manner providing various grooves and cavities for the operative elements of the lighter, including a sparking wheel 126, flint element 128, biasing spring 130 and depressible fingerpiece 132. An upper cover piece 134 is attached to the top of the lighter and extends over these operative elements to hold them in place. A leaf type resilient arm 136 extends upwardly from the fingerpiece 132 and abuts the upper cover piece to bias the fingerpiece in a counterclockwise or undepressed position.

A burner tube 138 extends from within the fuel containing recess 122 and up through an opening 140 in its top wall to a burner opening 142 in the vicinity of the sparking wheel 126 and flint element 128. The burner tube has a bent, partially flattened portion 144 just above the top wall opening 140. This flattened portion is resiliently constrictable so that the fuel passage therein at that point may be varied in cross sectional area simply by moving the tube up and down at a point beyond the flattened portion. As shown in the drawings this is accomplished by means of a claw shaped arrangement 146 on one end of the depressible fingerpiece, which arrangement grips the burner tube at a point between the flattened portion 144 and the burner opening 142.

In operating the lighter the fingerpiece is fully depressed to pull upwardly on the burner tube and fully open its resiliently constrictable flattened portion. The sparking wheel is then rotated to ignite the fuel being emitted from the burner tube. When this occurs the fingerpiece may then be partially released to partially constrict the fuel passage in the vicinity of the flattened portion 144 and thus to provide adjustment of flame height. Release of the fingerpiece after use allows the burner tube to return to its normal position wherein its flattened portion becomes fully constricted to prevent further flow of fuel from the reservoir.

Figure 9:
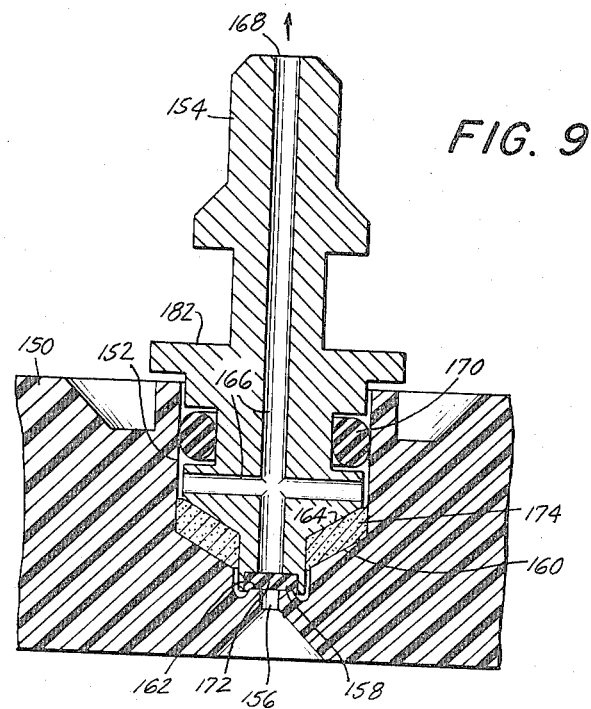
FIG. 9 is a section view of a valve arrangement forming a portion of the present invention.

The valve arrangement of FIG. 9 provides both gradual flow adjustment and positive flow control at separate and displaced points along a gas passageway, but utilizes only a single longitudinally movable valve element to perform both operations. The valve is provided with a stationary portion 150 which may either be formed directly in the top wall of the lighter body or which may be a separate element extending through and sealably engaged with the top wall. The stationary portion is formed with an upper recess 152 for receiving a movable valve element 154; and is further provided with a lower gas passage 156 leading from a point within the lighter fuel reservoir to the upper recess 152. The upper recess is shaped with a first horizontally extending surface 158 which immediately surrounds the upper opening of the lower gas passage 156 and a second slanted surface 160 which extends outwardly and upwardly about the upper recess from a point above the first surface.

The movable valve element 154 is shaped to conform generally to the upper recess 152 in the stationary valve portion but to fit loosely therein. Thus the movable valve element is also provided wih a first horizontally extending surface 162 at its lowermost portion and a second slanting surface 164 which rises upwardly and outwardly above the horizontal portion. An upper gas passage 166 enters into the movable valve member from a point immediately above its slanting surface 164 and extends up to a burner opening 168 on top of the valve. An O-ring seal 170 surrounds the movable valve element 154 at a point just above the upper gas passage entrance and permits the movable element to move up and down relative to the stationary portion 150 without leakage of gas therebetween.

It will be appreciated that the corresponding horizontal and slanting surfaces of the movable valve element and stationary portion cooperate to form intermediate gas passages between the lower and upper gas passages 156 and 166. Because of the difference in angular relationship which each set of surfaces bears with respect to the direction of longitudinal or up and down movement of the movable valve element, it can be seen that the passage formed by the horizontal surfaces varies in cross sectional area much more rapidly than that formed by the slanted surfaces. Thus, by arranging these surfaces such that the slanted ones remain displaced when the horizontal surfaces come together, it is possible to cause positive flow control, or unchecking, between the horizontal surfaces and simultaneous gradual flow adjustment between the slanted surfaces by simple upward movement of the single movable valve element 154.

In order to ensure positive flow control the horizontal surface 162 of the movable valve element is formed of a gasket type insert 172 of rubber, plastic or some other conformable material. Also, the gradual control operation can easily be augmented by providing a porous resiliently compressible medium 174 such as foamed platic, between the slanting surfaces.

Figure 10:
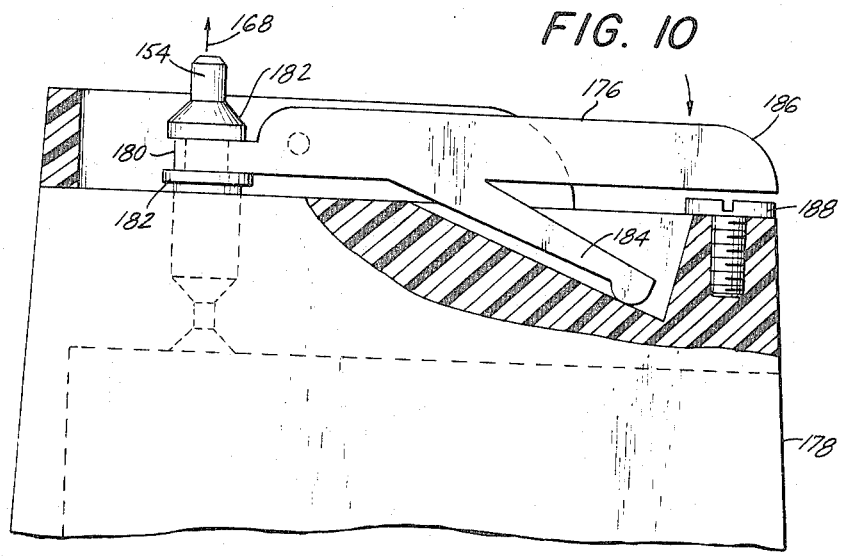
FIG. 10 is a side view, partially in section of the top portion of a lighter incorporating the valve arrangement of FIG. 9.

FIG. 10 illustrates a lighter arrangement incorporating the above described valve. Here a depressible fingerpiece 176 is pivotally mounted on the top of a lighter body 178 and has a forked end 180 which engages the movable valve element 154 between flanged elements 182 thereon. The fingerpiece has an integral resilient arm 184 which presses against the lighter body to bias the fingerpiece in a counterclockwise or undepressed position. This causes the horizontal surfaces in the valve to come together and completely shut off fuel flow through the valve. Upon depressing a finger engageable portion 186 of the fingerpiece, it is caused to rotate in a clockwise direction and its forked end 180 urges the movable valve element 154 upwardly to displace the horizontally extending surfaces 158 and 162 by a large amount and the slanted surfaces 160 and 164 by a small amount. Flame height can easily be controlled by varying the amount of finger pressure on the fingerpiece. If a maximum flame height is desired, a screw 188 may be provided in the lighter body and adjusted in height to limit the maximum amount of pivotal movement of the fingerpiece.

Figure 11:
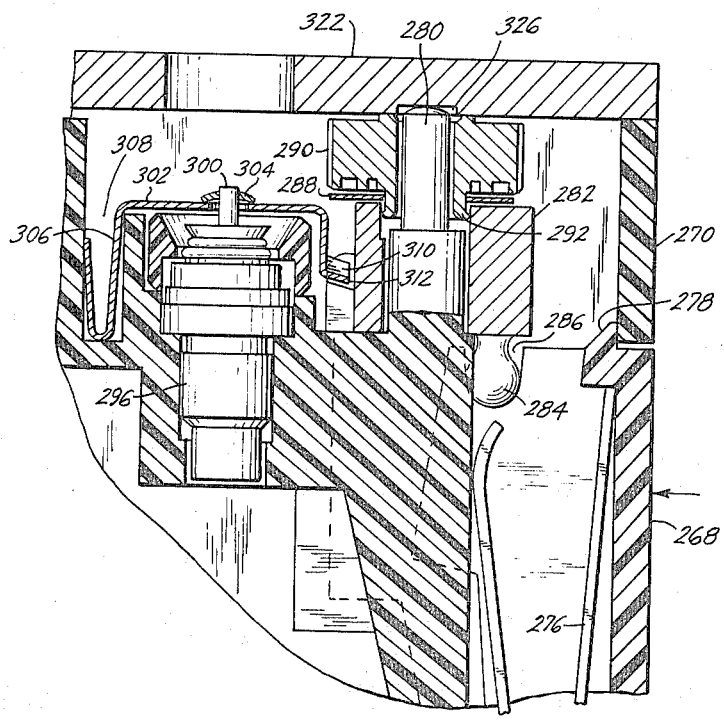
FIG. 11 is a fragmentary section view of another lighter incorporating the valve arrangement of FIG. 9.

It will readily be appreciated that arrangements other than the depressible fingerpiece configuration of FIG. 10 may be utilized for actuation of the above described valve. One such arrangement, shown in FIG. 11 and also shown and described in a co-pending application S.N. 297,129, filed on even date herewith by the inventors of the present invention, utilizes a rotatable cam 282 mounted on the same axle 280 as the lighter sparking wheel 290 and having a helical or spiralling cam surface 312 around its circumference. A flat spring element 302 extends from a fixed point on the lighter body to the helical cam surface 312 and is stressed to push down on the cam surface. An intermediate point on the spring is connected to a movable valve element 300, or the movable element 154 of the present valve and causes the movable valve element to move up and down with it. The cam 282 is rotated as by a movable fingerpiece 268, which may also rotate the sparking wheel 290; and the rotation of the cam causes its helical surface to lift the spring and open the valve. By controlling the rotation of the cam, the amount by which the movable valve element is lifted can be varied and consequently the flame height can easily be adjusted.

It can be seen that in each embodiment described the entire throttling process takes place across the gradually adjustable portion of the gas passage, the positive flow control means being such that little or no pressure drop occurs thereacross during operation of the lighter. On the other hand, when the lighter is not in use, the entire pressure drop between the lighter reservoir and the atmosphere takes place across the positive flow control means. Preferably, the positive flow control means would be located nearer the reservoir so that the gradual flow adjustment means would not become permeated with fuel in liquid form at the reservoir pressure when the lighter is not in use. Of course, in the case of the second and third embodiments, wherein both operations take place at the same point along the gas passage, this does not become a consideration.

The present invention, as will be appreciated, permits the rather numerous and complex operations involved in the ignition, the unchecking, the throttling and the adjustment of flow rate of the liquefied fuel in a small gas lighter to be accomplished with ease and safety while holding and operating the lighter with one hand.

Having thus described my invention with particular reference to the preferred forms thereof, it will be obvious to those skilled in the art to which the invention pertains, after understanding my invention, that various other changes and modifications may be made therein without departing from the spirit and scope of my invention, as defined by the claims appended thereto.

What is claimed as new and desired to be secured by Letters Patent is:

1. A hand held lighter of the gas fuel type comprising a reservoir for maintaining highly volatile fuel under pressure in its liquefied state, a sparking wheel having an abrading surface, a flint element biased against the abrading surface of said sparking wheel, a burner nozzle mounted external to said reservoir and near said sparking wheel and flint element, adjustable gas passage means between said reservoir and said burner nozzle, said adjustable gas passage means including first means for adjustably varying the flow of gas therethrough and further including second and distinct means for unchecking the flow of gas, and a fingerpiece connected to control both said first means and said second means during operation of said lighter, whereby movement of the same fingerpiece produces unsealing of said gas passage means and simultaneously permits control of flame height above the lighter.

2. A hand held lighter of the gas fuel type comprising a reservoir for maintaining highly volatile fuel under pressure in its liquefied state, a sparking wheel having an abrading surface and mounted for movement above said reservoir, a flint element biased against the abrading surface of said sparking wheel, a burner nozzle mounted external to said reservoir and near said sparking wheel and flint element, adjustable gas passage means between said reservoir and said burner nozzle, said adjustable gas passage means including first means for adjustably varying the flow of gas therethrough and further including second and distinct means for unchecking the flow of gas, a fingerpiece pivotally mounted on said reservoir, said fingerpiece including a finger engaging portion at one end, a valve engaging portion at the other end connected to said second means and a rotatable cam portion in the vicinity of its pivotal mounting and means interconnecting said cam portion of said fingerpiece and said first means on said adjustable gas passage means whereby pivotal movement of said fingerpiece effects opening of said second means and simultaneously permits adjustable control of gas flow therethrough.

3. A hand held pyrophoric device of the gas fuel type comprising:
 (a) a walled reservoir for maintaining highly volatile fuel under pressure in its liquefied state and having a reservoir outlet;
 (b) a burner valve assembly including:
   (1) a burner nozzle mounted externally of said reservoir,
   (2) a fluid passageway connecting said reservoir outlet with said burner nozzle,
   (3) a positive flow control means movable from a first position sealing said reservoir outlet to a second position where fluid flow through said reservoir outlet from said reservoir is unrestricted thereby, and
   (4) a gradual flow adjustment means movable over a range of positions when said positive flow control means is in said second position to vary the rate of flow of fluid from said reservoir through said burner nozzle;
 (c) ignition means operable to produce ignition of fluid passing out from said burner nozzle; and
 (d) a fingerpiece connected to said burner valve assembly and operable in response to simple finger movement to move said positive flow control means from said first position to said second position and to thereafter move said gradual flow adjustment means over said range of positions.

4. A hand held pyrophoric device of the gas fuel type as set forth in claim 3 wherein:
 (a) said positive flow control means is positioned at a point directly exposed to the said pressure of the fuel maintained within said reservoir.

5. A hand held lighter of the gas fuel type comprising:
 (a) a reservoir for maintaining highly volatile fuel under pressure in its liquefied state;
 (b) a sparking wheel having an abrading surface;
 (c) a flint element biased against the abrading surface of said sparking wheel;
 (d) a burner nozzle located externally of said reservoir and near said sparking wheel and flint element;
 (e) a fluid passageway extending between the interior of said reservoir and said burner nozzle;
 (f) valve means having two movable flow control surfaces disposed at separate points along said fluid passageway with one of said surfaces adapted to vary the rate of flow of fluid through said passageway after said other surface is moved to open said passageway and with a minimum of pressure change across said other surface; and
 (g) a fingerpiece mounted for movement relative to said reservoir and connected to said valve means for moving said other surface to open said passageway and for thereafter moving said one surface to vary the rate of flow of fluid along said passageway.

6. A hand held lighter of the gas fuel type comprising:
 (a) a reservoir for maintaining highly volatile fuel under pressure in its liquefied state;
 (b) a sparking wheel having an abrading surface;
 (c) a flint element biased against the abrading surface of said sparking wheel;
 (d) a burner nozzle mounted externally to said reservoir near said sparking wheel and flint element;
 (e) a valve element extending into one wall of said reservoir and movable back and forth in a given direction over a limited distance with respect to said one wall, said valve element having:
   (1) two separate surfaces each of which extends at least partially transversely to said given direction and each of which faces a corresponding surface in said one wall to define therebetween first and second portions of a gas passageway with the surfaces defining said first portion being more transverse than the surfaces defining said second portion so as to effect a more sudden opening and closing of said first portion and a more gradual opening and closing of said second portion as said valve element is moved in said given direction;
 (f) said one wall containing a fluid conduit leading from the interior of said reservoir to one end of said gas passageway;
 (g) a further fluid conduit leading from the other end of said gas passageway to said burner nozzle; and
 (h) a single actuator lever movably mounted on said reservoir and connected to said valve element to move it back and forth in said given direction during operation of said lighter to open said first portion of said gas passageway and to thereafter vary the opening of said second portion with a minimum of pressure change across the first portion of said passageway so as to thereby control the rate of flow of fuel through said passageway.

7. The lighter described in claim 6 further including a resiliently compressible porous material between the surfaces defining the second portion of said passageway to effect a more gradual adjustment thereof.

8. The lighter described in claim 6 wherein the first portion of said passageway is closer to said reservoir than the second portion of said passageway.

9. A valve assembly for use in connection with gas fueled lighters, said valve assembly comprising:
 (a) a stationary member having a recess therein; and
 (b) a movable member mounted for movement in a given direction within said recess wherein:
   (1) the facing surfaces of said movable member and said stationary member define two consecutive portions of a fluid passageway therebetween, and (2) the surfaces defining one of said portions are disposed more nearly transverse to said given direction that the surfaces defining the other of said portions whereby movement of said movable element produces rapid and large opening of said one portion and subsequent gradual adjustment of the size of opening of said other portion from a minimum which is less than the size of said large opening.

10. The valve assembly defined in claim 9 further including a resiliently compressible porous material between the surfaces defining the other portion of said gas passageway to provide a more gradual adjustment thereof.

References Cited by the Examiner
UNITED STATES PATENTS

| | | | |
|---|---|---|---|
| 2,153,432 | 4/39 | Reich | 67—7.1 |
| 2,551,688 | 5/51 | Metzler | 67—7.1 |
| 2,565,903 | 8/51 | Zellweger. | |
| 2,594,754 | 4/52 | Felt | 67—7.1 |
| 2,671,328 | 3/54 | Flamm | 67—7.1 |
| 2,743,597 | 5/56 | Newman | 67—7.1 |
| 2,971,361 | 2/61 | Breitenstein | 67—7.1 |

EDWARD J. MICHAEL, *Primary Examiner.*

UNITED STATES PATENT OFFICE
CERTIFICATE OF CORRECTION

Patent No. 3,208,243                      September 28, 1965

Conrad Zellweger et al.

It is hereby certified that error appears in the above numbered patent requiring correction and that the said Letters Patent should read as corrected below.

Column 1, line 69, for "Thils" read -- This --; line 70, for "construction" read -- constriction --; column 2, line 28, for "prevent" read -- present --; line 65, for "sparkling" read -- sparking --; column 3, line 67, for "pulverized" read -- pressurized --; column 5, line 41, for "wih" read -- with -- column 6, line 1, for "platic" read -- plastic --; column 8, line 73, for "recesse" read -- recess --.

Signed and sealed this 31st day of May 1966.

(SEAL)
Attest:

ERNEST W. SWIDER                                EDWARD J. BRENNER
Attesting Officer                                       Commissioner of Patents